United States Patent
An et al.

(10) Patent No.: US 9,362,579 B2
(45) Date of Patent: Jun. 7, 2016

(54) FUEL CELL SYSTEM AND DRIVING METHOD THEREOF

(75) Inventors: Seong-Jin An, Yongin-si (KR); Jin-Hwa Lee, Yongin-si (KR); Chi-Seung Lee, Yongin-si (KR)

(73) Assignee: SAMSUNG SDI CO., LTD., Yongin-Si, Gyeonggi-Do (KR)

( * ) Notice: Subject to any disclaimer, the term of this patent is extended or adjusted under 35 U.S.C. 154(b) by 292 days.

(21) Appl. No.: 13/247,338

(22) Filed: Sep. 28, 2011

(65) Prior Publication Data

US 2013/0004873 A1  Jan. 3, 2013

(30) Foreign Application Priority Data

Jun. 30, 2011 (KR) .......................... 10-2011-0065024

(51) Int. Cl.
H01M 8/04 (2006.01)

(52) U.S. Cl.
CPC ........ H01M 8/0432 (2013.01); H01M 8/04559 (2013.01); H01M 8/04753 (2013.01); Y02E 60/50 (2013.01)

(58) Field of Classification Search
None
See application file for complete search history.

(56) References Cited

U.S. PATENT DOCUMENTS

| | | | |
|---|---|---|---|
| 2005/0053810 A1* | 3/2005 | Kato et al. | 429/13 |
| 2008/0044691 A1* | 2/2008 | Wake et al. | 429/13 |
| 2008/0152972 A1* | 6/2008 | Igarashi et al. | 429/22 |

FOREIGN PATENT DOCUMENTS

| | | | |
|---|---|---|---|
| JP | 2006-100095 A | | 4/2006 |
| JP | 2006100095 A | * | 4/2006 |
| JP | 2006-127860 A | | 5/2006 |
| JP | 2006127860 A | * | 5/2006 |
| JP | 2007-242449 A | | 9/2007 |
| JP | 2009-026529 A | | 2/2009 |
| JP | 2009-224261 A | | 10/2009 |
| KR | 10-0750769 B1 | | 8/2007 |
| KR | 10-2011-0028159 A | | 3/2011 |

OTHER PUBLICATIONS

Y. Ishikawa et al., Super-cooled water behavior inside polymer electrolyte fuel cell cross-section below freezing temperature, Journal of Power Sources 179 (2008) 547-552.
KIPO Office Action issued Dec. 26, 2012 in Korean Application No. KR-10-2011-0065024 A, which is the priority application to the present application.
KIPO Notice of Allowance issued Jun. 28, 2013 in KR 10-2011-0065024, which corresponds to the present application.

* cited by examiner

*Primary Examiner* — Daniel Gatewood
(74) *Attorney, Agent, or Firm* — Knobbe, Martens, Olson & Bear LLP

(57) ABSTRACT

A fuel cell system and a method for driving a fuel cell system are disclosed. The fuel cell system includes a fuel cell stack with a plurality of unit cells, a temperature measurer configured for determining a temperature of the fuel cell stack, a cell voltage measurer configured for determining voltages of one or more of the plurality of unit cells, and a control unit configured for monitoring the unit cell voltages of the plurality of unit cells to detect a minimum unit cell voltage when a measured temperature of the fuel cell stack is below zero, and configured for controlling the load current so that the detected minimum unit cell voltage may be maintained at a predetermined threshold voltage.

8 Claims, 2 Drawing Sheets

FUEL CELL SYSTEM AND DRIVING METHOD THEREOF

CROSS-REFERENCE TO RELATED APPLICATIONS

This application claims priority to and the benefit of Korean Patent Application No. 10-2011-0065024 filed in the Korean Intellectual Property Office on Jun. 30, 2011, the entire contents of which are incorporated herein by reference.

BACKGROUND

1. Field

The present disclosure relates to a fuel cell system and a driving method thereof. More particularly, the present disclosure relates to a fuel cell system configured to be driven under sub-zero temperature conditions, and a driving method thereof.

2. Description of the Related Technology

A fuel cell is a device that electrochemically produces power using fuel (hydrogen or reformed gas) and an oxidizing agent (oxygen or air) continuously supplied from the exterior of the device. Namely, the fuel cell directly converts the fuel and the oxidizing agent into electrical energy through an electrochemical reaction. The oxidant of the fuel cell includes oxygen or air containing a large amount of pure oxygen. The fuel includes a large amount of hydrogen generated by reforming pure hydrogen or a hydrocarbon-based fuel (LNG, LPG, $CH_3OH$).

One type of fuel cell is a polymer electrode membrane fuel cell (PEMFC). The polymer electrolyte membrane fuel cell has high output density and high energy transformation efficiency, and is operable at a temperature of 80° C. or less. In addition, the polymer electrolyte membrane fuel cell can be miniaturized and sealed. Thus, the PEMFC has been widely used as a power source for a variety of applications such as for a pollution-free vehicle, home power equipment, mobile communication equipment, military equipment, medical equipment, and the like.

The PEMFC includes a membrane electrode assembly (MEA) in which an electrochemical reaction is performed. When the fuel cell stack is driven at a sub-zero temperature, the MEA does not perform a fluent reaction, which makes generation of sufficient energy and heat difficult. When the fuel cell stack is continuously exposed to sub-zero temperatures and fails to generate sufficient heat, it will stop generating electricity. The electrochemical reaction, which under normal conditions also generates water as well as heat and electricity, will stop producing water. Water generated at the sub-zero temperature will freeze into ice, which further interferes with the electrochemical reaction. Also, the formation of ice causes the volume of water to expand, which may damage the major components of the fuel cell, particularly the MEA. For the PEMFC, water plays an important role in conducting protons. If the water in the PEMFC freezes, the protons cannot be conducted and no electricity can be generated.

The above information disclosed in this Background section is only for enhancement of understanding and therefore it may contain information that does not form the prior art that is already known in this country to a person of ordinary skill in the art.

SUMMARY OF CERTAIN INVENTIVE ASPECTS

Some aspects of the present disclosure provide a fuel cell system that may be driven at a sub-zero temperature and/or a driving method thereof.

In one aspect a fuel cell system configured to supply a load current to a load includes, for example, a fuel cell stack including a plurality of unit cells, a temperature measurer configured to determine temperature of the fuel cell stack, a cell voltage measurer configured to determine voltage of at least one of the plurality of unit cells, and a control unit.

In some embodiments, the control unit is configured for monitoring the unit cell voltages of the plurality of unit cells to detect a minimum unit cell voltage when the temperature of the fuel cell stack is below zero. In some embodiments, the control unit is configured for controlling load current so the detected minimum unit cell voltage may be maintained at a predetermined threshold voltage. In some embodiments, the threshold voltage includes a voltage greater than 0V. In some embodiments, the fuel cell system further includes a fuel supplier in fluid communication with and configured to supply fuel to the fuel cell stack. In some embodiments, the fuel cell system further includes an oxidizing agent supplier in fluid communication with and configured to supply an oxidizing agent to the fuel cell stack. In some embodiments, the fuel cell system further includes a supply controller configured to control supply of the fuel and the oxidizing agent and configured to supply a predetermined amount of air together with fuel to anodes of the plurality of unit cells. In some embodiments, at least one anode of the plurality of unit cells is configured to receive a mixture of air and fuel. In some embodiments, the mixture includes about 1-30% air of the volume of the hydrogen in the fuel. In some embodiments, the control unit is configured to reduce the load current when the minimum unit cell voltage is less than the threshold voltage. In some embodiments, the control unit is configured to increase the load current when the minimum unit cell voltage is greater than the threshold voltage. In some embodiments, the control unit is configured to reduce or increase the load current by a unit current amount.

In another aspect, a method for driving a fuel cell system includes, for example, measuring temperature of a fuel cell stack, the fuel cell stack including a plurality of unit cells, supplying a predetermined volume of fuel and oxidizing agent to the fuel cell stack when the measured temperature of the fuel cell stack is below zero, generating a current while maintaining a minimum unit cell voltage from among unit cell voltages of the plurality of unit cells at a threshold voltage, and determining whether the measured temperature of the fuel cell stack has reached a target temperature.

In some embodiments, the supplying of a predetermined volume of fuel and oxidizing agent to the fuel cell stack includes supplying a predetermined volume of air together with the fuel to the anodes of the plurality of unit cells. In some embodiments, the supplying of a predetermined volume of fuel and oxidizing agent to the fuel cell stack includes supplying the oxidizing agent to cathodes of the plurality of unit cells. In some embodiments, a predetermined volume of air is supplied to the anodes of the plurality of unit cells within the range of 1-30% of the volume of the hydrogen included in the fuel. In some embodiments, the threshold voltage includes a voltage greater than 0V for maximally inducing generation of heat of the fuel cell stack at a sub-zero temperature. In some embodiments, the generating of a current while maintaining a minimum unit cell voltage at a threshold voltage includes measuring unit cell voltages of the plurality of unit cells. In some embodiments, the generating of a current while maintaining a minimum unit cell voltage at a threshold voltage includes comparing the minimum unit cell voltage and a threshold voltage. In some embodiments, the method further includes reducing a load current flowing to a load when the minimum unit cell voltage is less than the threshold voltage. In some embodiments, the load current may be reduced by the unit current amount. In some embodiments, the method further includes increasing a load current flowing to a load when the minimum unit cell voltage is greater than the threshold voltage. In some embodiments, the load current may be increased by a unit current amount. In some embodiments, the determining of whether the temperature of the fuel cell stack has reached a target temperature includes determining whether the generated current has reached a target current. In some embodiments, the determining of whether the temperature of the fuel cell stack has reached a target temperature includes determining whether the temperature of the fuel cell stack has reached the target temperature when the generated current reaches the target current. In some embodiments, the method further includes switching to a normal mode when the temperature of the fuel cell stack reaches the target temperature.

BRIEF DESCRIPTION OF THE DRAWINGS

Features of the present disclosure will become more fully apparent from the following description and appended claims, taken in conjunction with the accompanying drawings. It will be understood these drawings depict only certain embodiments in accordance with the disclosure and, therefore, are not to be considered limiting of its scope; the disclosure will be described with additional specificity and detail through use of the accompanying drawings. An apparatus, system or method according to some of the described embodiments can have several aspects, no single one of which necessarily is solely responsible for the desirable attributes of the apparatus, system or method. After considering this discussion, and particularly after reading the section entitled "Detailed Description of Certain Inventive Embodiments" one will understand how illustrated features serve to explain certain principles of the present disclosure.

DETAILED DESCRIPTION OF CERTAIN INVENTIVE EMBODIMENTS

Figure 1:
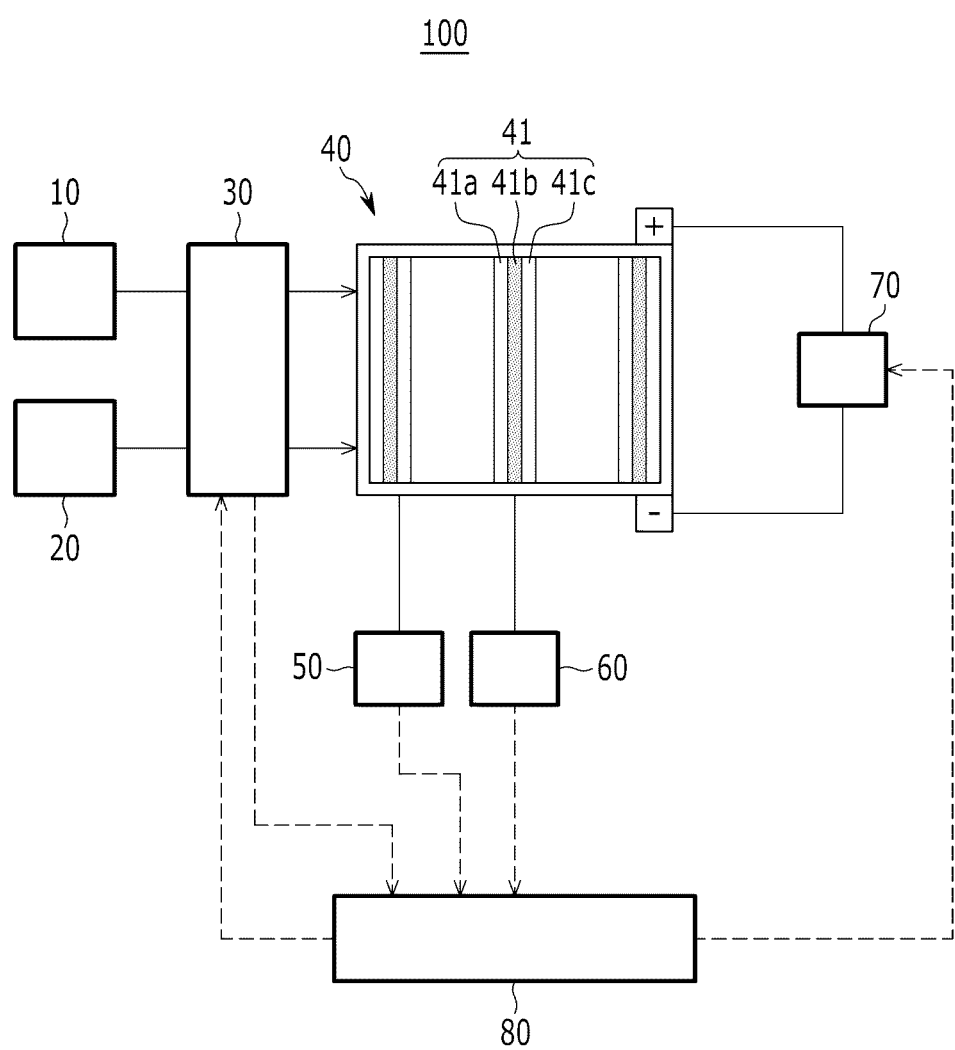
FIG. 1 shows a block diagram of a configuration of a fuel cell system according to an exemplary embodiment of the present disclosure.

In the following detailed description, only certain exemplary embodiments have been shown and described, simply by way of illustration. As those skilled in the art would realize, the described embodiments may be modified in various different ways, all without departing from the spirit or scope of the present disclosure.

Further, in the embodiments, like reference numerals designate like elements throughout the specification representatively in a first embodiment, and only elements of embodiments other than those of the first embodiment will be described. The drawings and description are to be regarded as illustrative in nature and not restrictive. Like reference numerals designate like elements throughout the specification. However, it should be understood that the disclosure is not limited to a specific embodiment but includes all changes and equivalent arrangements and substitutions included in the spirit and scope of the disclosure. In the following description, features known in the art that may confuse the subject matter of the present disclosure will be omitted.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising" will be understood to imply the inclusion of stated elements but not the exclusion of any other elements.

FIG. 1 shows a block diagram of a configuration of a fuel cell system according to one exemplary embodiment. Referring to FIG. 1, the fuel cell system 100 can use the polymer electrode membrane fuel cell (PEMFC) method for reforming fuel to generate hydrogen and control the hydrogen and oxygen to electrochemically react to generate electrical energy. However, the present disclosure is not restricted to this. For example, the fuel cell system 100 may use a liquid or gas fuel including hydrogen such as methanol, ethanol, LPG, LNG, gasoline, or butane gas. In this instance, the fuel cell stack 40 may be configured as a direct oxidation fuel cell type generating electrical energy by directly reacting a liquid or a gas fuel by the unit cell. The fuel used by the fuel cell system 100 may include hydrocarbon fuel in liquid or gas state such as methanol, ethanol, natural gas, or LPG. The fuel cell system 100 may be configured to use oxygen gas stored in an additional storage means or air as an oxidizing agent that reacts with hydrogen.

The fuel cell system 100 includes a fuel supplier 10, an oxidizing agent supplier 20, a supply controller 30, a fuel cell stack 40, a temperature measurer 50, a cell voltage measurer 60, a load 70, and a control unit 80.

The fuel supplier 10 may be configured to supply fuel to the fuel cell stack 40. The fuel supplier 10 includes a fuel tank, which may be configured for storing liquid fuel and a fuel pump, which may be configured for outputting liquid fuel from the fuel tank with predetermined pumping force.

The oxidizing agent supplier 20 may be configured for supplying an oxidizing agent to the fuel cell stack 40. The oxidizing agent supplier 20 includes an oxidizing agent pump configured for providing external air to the fuel cell stack 40 with a predetermined pumping power.

The supply controller 30 may be configured to measure and control the amount of the fuel and the oxidizing agent supplied to the fuel cell stack 40. The supply controller 30 may be configured to control the amount of the supplied fuel by using a mass flow controller connected to a fuel supply pipe, which fuel supply pipe fluidly connects the fuel supplier 10 and the fuel cell stack 40. The supply controller 30 may be configured to control the amount of the supplied oxidizing agent by using another mass flow controller connected to an oxidizing agent supply pipe, which oxidizing agent supply pipe fluidly connects the oxidizing agent supplier 20 and the fuel cell stack 40.

The fuel cell stack 40 may include a plurality of unit cells configured for generating electrical energy through an oxidation/reduction reaction of the fuel and the oxidizing agent. Each unit cell 41 may include a membrane electrode assembly (MEA) 41b configured for oxidizing and reducing the oxygen in the fuel and the oxidizing agent, respectively. Each unit cell 41 may include separators (also called bipolar plates 41a and 41c) configured for supplying the fuel and the oxidizing agent to the membrane electrode assembly 41b. The unit cell 41 has a configuration in which the separators 41a and 41c are disposed on both sides and sandwiching the membrane electrode assembly 41b in the center. The membrane electrode assembly 41b includes an electrolyte membrane, a cathode disposed on a first side of the electrolyte membrane, and an anode disposed on a second side of the electrolyte membrane. In operation of the device, the oxidizing agent may be supplied to the cathode through the separators 41*a* and 41*c*, and the fuel may be supplied to the anode. The fuel cell system 100 includes the fuel cell stack 40 in which the unit cells 41 are disposed in sequence.

The temperature measurer 50 is configured to measure or otherwise determine the temperature of the fuel cell stack 40. The temperature measurer 50 may be configured to determine the temperature of the fuel cell stack 40 using a thermocouple. The thermocouple combines two kinds of metals and uses the current that flows between the two metals according to a temperature difference on both bonded ends to measure the temperature.

The cell voltage measurer 60 is configured to measure or otherwise determine voltages of a plurality of unit cells. The voltage of each unit cell will be called a unit cell voltage. The cell voltage measurer 60 may be configured to determine voltages of the plurality of unit cells using a voltage sensor configured for measuring a voltage less than 1V.

The load 70 is electrically connected to a positive (+) terminal and a negative (−) terminal of the fuel cell stack 40. In operation of the device, the load 70 may consume the electrical energy generated by the fuel cell stack 40. The load 70 may include one or more types of electrical devices such as a vehicle motor, an inverter for inverting DC electricity into AC electricity, and/or a heating device.

The control unit 80 may be configured to control the supply controller 30, the fuel cell stack 40, and the load 70. The control unit 80 may be configured to receive supply measuring information of the fuel and oxidizing agent from the supply controller 30. The control unit 80 may be configured to transmit supply control information on the fuel and the oxidizing agent to the supply controller 30. The supply controller 30 may be configured to control the supply amount of the fuel and the oxidizing agent according to the supply control information. The control unit 80 may be configured to receive a temperature of the fuel cell stack 40 from the temperature measurer 50. The control unit 80 may be configured to receive voltages of the unit cells from the cell voltage measurer 60 to control the fuel cell stack 40. The control unit 80 may be configured to measure or determine power output to the load 70 and controls driving of the load 70 to control output power.

The control unit 80 may be configured to drive the system in a normal mode when the temperature of the fuel cell stack 40 is above zero, and drive the system in a constant current mode when the temperature of the fuel cell stack 40 is below zero. The normal mode represents a general drive method for the fuel cell system 100. The constant current mode represents a driving method for monitoring voltages of a plurality of unit cells at the sub-zero temperature and generating a current with reference to the minimum unit cell voltage.

Embodiments of the present disclosure may be configured to drive the fuel cell system 100 at the sub-zero temperature under otherwise normal conditions. The normal mode well known to a skilled person will not be described, and the constant current mode drive will now be described.

Figure 2:
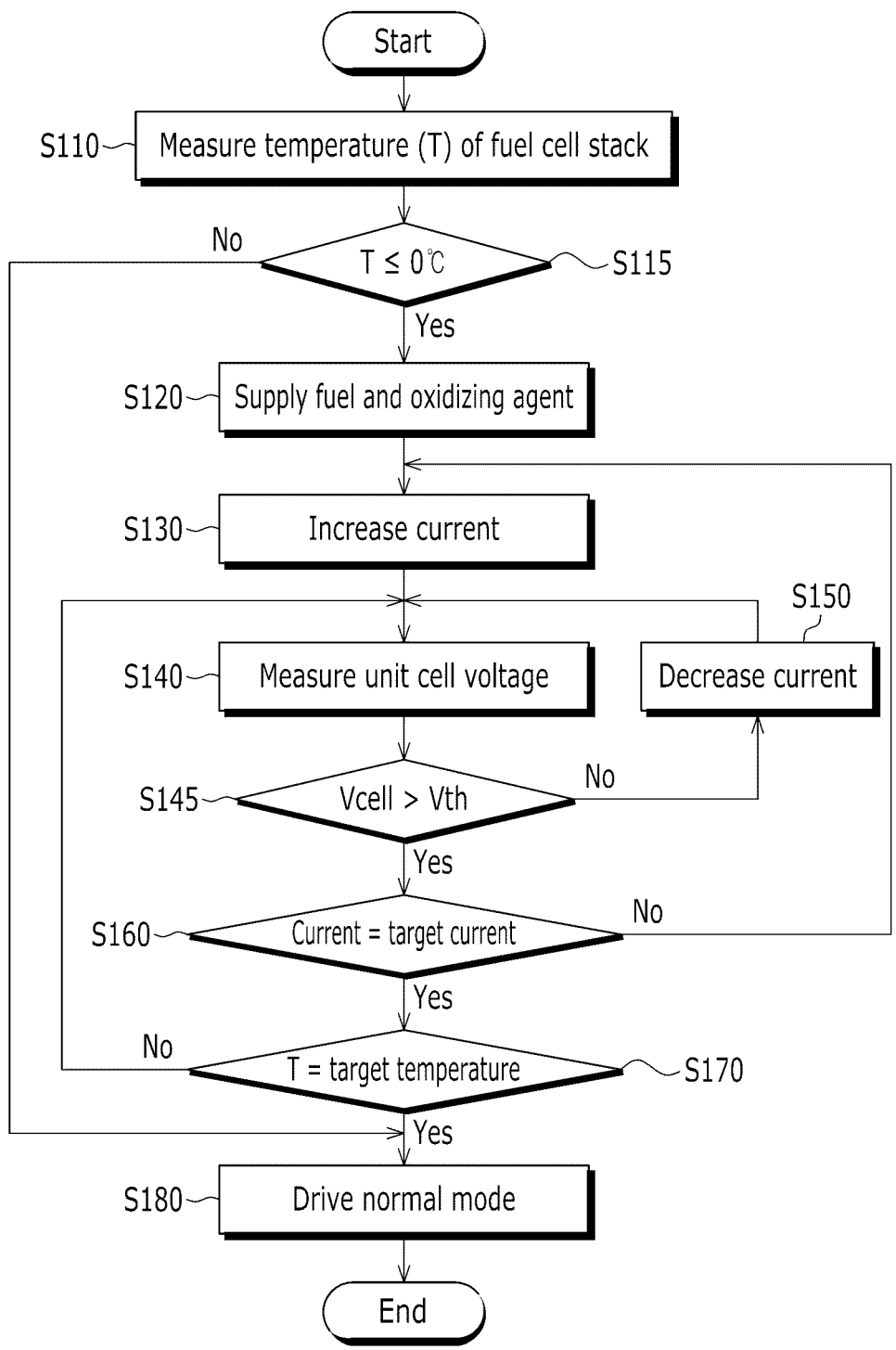
FIG. 2 shows a flowchart of a method for driving a fuel cell system according to an exemplary embodiment of the present disclosure.

A constant current mode drive of the fuel cell system 100 will now be described with reference to FIG. 2. FIG. 2 shows a flowchart of a method for driving a fuel cell system according to an exemplary embodiment of the present disclosure. Referring to FIG. 2, in step (S110) the temperature measurer 50 measures or otherwise determines a temperature (T) of the fuel cell stack 40. In process (S115), the control unit 80 determines whether the temperature (T) of the fuel cell stack 40 is below zero or not. When the temperature of the fuel cell stack 40 is above zero, the control unit 80 performs the normal mode drive in step (S180). When the temperature at the fuel cell stack 40 is below zero the control unit 80 performs the constant current mode. The temperature of the fuel cell stack 40 will be assumed to be below zero hereinafter.

Regarding the constant current mode drive, in step (S120) the control unit 80 transmits supply control information to the supply controller 30 so that a predetermined amount of fuel and oxidizing agent may be supplied to the fuel cell stack 40. The fuel is supplied to the anodes of the plurality of unit cells included in the fuel cell stack 40, and the oxidizing agent to the cathodes. The fuel cell stack 40 generates a current according to oxidation/reduction reactions of the fuel and the oxidizing agent. In this instance, the supply controller 30 controls a predetermined volume of air together with the fuel to be supplied to the anodes of the plurality of unit cells. The air supplied to the anodes can be supplied thereto within the range of 1-30% with respect to the volume of hydrogen included in the fuel. When a predetermined volume of air is supplied to the anode with the fuel, a combustion reaction is increased at the anodes to induce generation of heat by the fuel cell stack 40.

In step (S130), the control unit 80 controls driving of the load 70 to increase the load current flowing to the load 70. The control unit 80 can increase the load current by the unit current amount. For example, the control unit 80 increases the load current for each 1A unit step by step.

In step (S140), the cell voltage measurer 60 measures or otherwise determines unit cell voltages of the plurality of cell unit cells. The cell voltage measurer 60 transmits the measured unit cell voltages to the control unit 80.

In process step (S145) the control unit 80 determines whether the minimum unit cell voltage (Vcell) is greater than a predetermined threshold voltage (Vth). The control unit 80 drives the fuel cell stack 40 within the voltage range in which the minimum unit cell voltage (Vcell) is greater than 0V and the current can be generated to the maximum. The threshold voltage (Vth) represents a voltage by which the maximum amount of current is generated at the sub-zero temperature and the generation of heat of the fuel cell stack 40 is induced to the maximum, and it can be defined experimentally. This is because, when the minimum unit cell voltage (Vcell) is less than 0V, a reverse voltage is generated to cause loss of a cathode catalyst, and when the minimum unit cell voltage (Vcell) is greater than the threshold voltage (Vth), the lesser current is generated to reduce generation of heat of the fuel cell stack 40. For example, regarding the fuel cell stack 40 with a unit cell voltage that is greater than 0.45V in the case of the normal mode drive, the threshold voltage (Vth) for the constant current mode drive can be set to be 0.2V.

In step (S150), the control unit 80 reduces the load current when the minimum unit cell voltage (Vcell) is less than the threshold voltage (Vth). The control unit 80 can reduce the load current by the same unit current as the case when the load current is increased. For example, the control unit 80 can reduce the load current for each 1A step by step. A predetermined amount of fuel and oxidizing agent are supplied to the fuel cell stack 40 to generate power so when the load current output to the load 70 is reduced, voltages of the plurality of unit cells are increased. As a result, the minimum unit cell voltage (Vcell) is also increased.

In process step (S160), the control unit 80 determines whether the load current has reached a target current when the minimum unit cell voltage (Vcell) is greater than the threshold voltage (Vth). The target current represents an output current of the fuel cell stack 40 for inducing generation of heat of the fuel cell stack 40 to the maximum, and it can be defined experimentally according to types or performance of the fuel cell stack 40. When the load current has not reached the target current, the control unit 80 repeatedly increases the load current in step (S130), measures the unit cell voltage in step (S140), and compares the minimum unit cell voltage (Vcell) and the threshold voltage (Vth) in process step (S145). Accordingly, the load current increases for each unit current amount step by step to reach the target current.

That is, the control unit 80 decreases the load current when the minimum unit cell voltage (Vcell) is less than the threshold voltage (Vth), and it increases the load current when the minimum unit cell voltage (Vcell) is greater than the threshold voltage (Vth), thereby generating the current while maintaining the minimum unit cell voltage (Vcell) at the threshold voltage (Vth). The minimum unit cell voltage (Vcell) is maintained at the threshold voltage (Vth) so generation of heat of the fuel cell stack 40 is induced to the maximum.

In process step (S170), when the load current reaches the target current, the control unit 80 determines whether the temperature (T) of the fuel cell stack 40 has reached a predetermined target temperature. The target temperature represents a temperature that is above zero at which the fuel cell stack 40 is driven in the normal mode, and it is found through experiments. When the temperature (T) of the fuel cell stack 40 does not reach the target temperature, the control unit 80 drives the fuel cell stack 40 until the temperature (T) of the fuel cell stack 40 reaches the target temperature. In this instance, the control unit 80 periodically measures the unit cell voltage in step (S140), compares the minimum unit cell voltage (Vcell) and the threshold voltage (Vth) in process step (S145), determines whether the load current has reached the target current in process step (S160), and determines whether the temperature (T) of the fuel cell stack 40 has reached the target temperature in process step (S170) so that the minimum unit cell voltage (Vcell) may maintain the threshold voltage (Vth) and the load current may maintain the target current.

When the temperature (T) of the fuel cell stack 40 reaches the target temperature, the control unit 80 is switched to the normal mode drive in step (S180).

As described above, when the fuel cell stack 40 is driven at the sub-zero temperature, the maximum current can be generated by increasing the load current step by step so that the minimum unit cell voltage (Vcell) may maintain the threshold voltage (Vth). Accordingly, the temperature (T) of the fuel cell stack 40 can be quickly increased to the target temperature, and the fuel cell stack 40 can be driven by the normal mode.

While the present invention has been described in connection with certain exemplary embodiments, it will be appreciated by those skilled in the art that various modifications and changes may be made without departing from the scope of the present disclosure. The drawings and the detailed description of certain inventive embodiments given so far are only illustrative, and they are only used to describe certain inventive embodiments, but should not be considered to limit the meaning or restrict the range of the present invention described in the claims. Indeed, it will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments. With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity. Therefore, it will be appreciated to those skilled in the art that various modifications may be made and other equivalent embodiments are available. Accordingly, the actual scope of the present invention must be determined by the spirit of the appended claims, and equivalents thereof.

What is claimed is:

1. A method for driving a fuel cell system, comprising:
   measuring temperature of a fuel cell stack, the fuel cell stack including a plurality of unit cells;
   supplying a predetermined volume of fuel and oxidizing agent to the fuel cell stack when the measured temperature of the fuel cell stack is below zero, wherein the supplying of a predetermined volume of fuel and oxidizing agent to the fuel cell stack comprises:
      supplying a volume of air together with the fuel in an amount 1-30% of the hydrogen included in the fuel to the anodes of the plurality of unit cells; and
      supplying the oxidizing agent to cathodes of the plurality of unit cells;
   generating a constant current while maintaining a minimum unit cell voltage to create maximum heat, the minimum unit cell voltage being maintained from among unit cell voltages of the plurality of unit cells at a threshold voltage, wherein the threshold voltage is greater than 0V and the maximum heat generation occurs when the measured temperature of the fuel cell stack is below zero; and
   determining whether the measured temperature of the fuel cell stack has reached a target temperature above zero.

2. The method of claim 1, wherein the generating of a current while maintaining the minimum unit cell voltage at the threshold voltage comprises:
measuring unit cell voltages of the plurality of unit cells; and comparing the minimum unit cell voltage and the threshold voltage.

3. The method of claim 2 further comprises reducing a load current flowing to a load when the minimum unit cell voltage is less than the threshold voltage.

4. The method of claim 3, wherein the load current is reduced by the unit current amount.

5. The method of claim 2 further comprises increasing a load current flowing to a load when the minimum unit cell voltage is greater than the threshold voltage.

6. The method of claim 5, wherein the load current is increased by a unit current amount.

7. The method of claim 1, wherein the determining of whether the temperature of the fuel cell stack has reached a target temperature comprises:
   determining whether the generated current has reached a target current; and
   determining whether the temperature of the fuel cell stack has reached the target temperature when the generated current reaches the target current.

8. The method of claim 1 further comprising switching to a normal mode when the temperature of the fuel cell stack reaches the target temperature.

* * * * *